US011178855B2

(12) United States Patent
Forner Domenech et al.

(10) Patent No.: US 11,178,855 B2
(45) Date of Patent: Nov. 23, 2021

(54) METHOD, DEVICE AND SYSTEM FOR HANDLING, GRADING AND VACCINATING LIVING BIRDS

(71) Applicant: AGRI Advanced Technologies GmbH, Visbek (DE)

(72) Inventors: Ivan Forner Domenech, Vinaròs (ES); Santiago Hernández Gómez, Vinaròs (ES)

(73) Assignee: AGRI ADVANCED TECHNOLOGIES GMBH, Visbek (DE)

( * ) Notice: Subject to any disclaimer, the term of this patent is extended or adjusted under 35 U.S.C. 154(b) by 280 days.

(21) Appl. No.: 16/069,987

(22) PCT Filed: Jan. 17, 2017

(86) PCT No.: PCT/EP2017/050886
§ 371 (c)(1),
(2) Date: Jul. 13, 2018

(87) PCT Pub. No.: WO2017/125387
PCT Pub. Date: Jul. 27, 2017

(65) Prior Publication Data
US 2019/0029228 A1    Jan. 31, 2019

(30) Foreign Application Priority Data

Jan. 18, 2016 (EP) .................................... 16151757

(51) Int. Cl.
*A01K 45/00* (2006.01)
*A61D 1/02* (2006.01)
(Continued)

(52) U.S. Cl.
CPC ............ *A01K 45/00* (2013.01); *A01K 13/003* (2013.01); *A01K 37/00* (2013.01); *A61D 1/025* (2013.01); *A61D 3/00* (2013.01)

(58) Field of Classification Search
CPC . A61D 7/00; A61D 1/025; A61D 3/00; A61D 19/02; A01K 13/003; A01K 45/00; A01K 37/00
See application file for complete search history.

(56) References Cited

U.S. PATENT DOCUMENTS 3,774,578 A * 11/1973 Randolph .............. A01K 37/00
119/714
3,777,752 A    12/1973 Goodwin
(Continued)

FOREIGN PATENT DOCUMENTS

CN    203120686 U    8/2013
CN    204016540 U    12/2014
(Continued)

OTHER PUBLICATIONS

FAO. 2007. Wild Birds and Avian Influenza: an introduction to applied field research and disease sampling techniques. Edited by D. Whitworth, S.H. Newman, T. Mundkur and P. Harris. FAO Animal Production and Health Manual, No. 5. Rome, http://www.fao.org/3/a1521e/a1521e.pdf (Year: 2007).*
(Continued)

*Primary Examiner* — Magdalena Topolski
*Assistant Examiner* — Arfan Y. Sinaki
(74) *Attorney, Agent, or Firm* — Westman, Champlin & Koehler, P.A.

(57)    ABSTRACT

The invention provides a device, a system and a method for handling, grading and vaccinating living birds, wherein the device comprises a main member; a receiving member rotatably attached to the main member and configured to
(Continued)

receive and hold the birds by their scapula-humeral joints in a first position and to release the birds in a second position; and a locking member movably attached to the main member and configured to lock the receiving member in the first position and to release the receiving member to rotate from the first position to the second position to release the birds.

21 Claims, 13 Drawing Sheets

(51) Int. Cl.
*A61D 3/00* (2006.01)
*A01K 13/00* (2006.01)
*A01K 37/00* (2006.01)

(56) References Cited

U.S. PATENT DOCUMENTS

| | | | | |
|---|---|---|---|---|
| 3,880,122 | A * | 4/1975 | Randolph | A01K 37/00 |
| | | | | 119/714 |
| 4,681,565 | A * | 7/1987 | Gourlandt | A61D 1/005 |
| | | | | 128/DIG. 1 |
| 4,758,227 | A * | 7/1988 | Lancaster, Jr. | A61D 1/025 |
| | | | | 604/144 |
| 6,396,938 | B1 | 5/2002 | Tao et al. | |
| 6,609,479 | B2 * | 8/2003 | Storer | A01K 45/00 |
| | | | | 119/716 |
| 6,634,319 | B1 * | 10/2003 | Zermoglio | A61D 1/025 |
| | | | | 119/713 |
| 7,721,674 | B2 * | 5/2010 | Smith | A61D 1/025 |
| | | | | 119/6.8 |
| 9,763,428 | B2 * | 9/2017 | Samson | A01K 37/00 |
| 10,350,041 | B2 * | 7/2019 | Samson | A61D 1/025 |
| 2007/0255216 | A1 | 11/2007 | Smith | |
| 2009/0000915 | A1 | 1/2009 | Nadreau et al. | |
| 2011/0313409 | A1 * | 12/2011 | Erickson | A61D 1/005 |
| | | | | 606/13 |
| 2012/0012070 | A1 * | 1/2012 | Gorans | A01K 1/0613 |
| | | | | 119/713 |
| 2012/0197181 | A1 * | 8/2012 | Grosbois | A61D 1/025 |
| | | | | 604/22 |
| 2014/0031790 | A1 * | 1/2014 | Johnson | A61D 1/025 |
| | | | | 604/506 |
| 2015/0148771 | A1 | 5/2015 | Samson et al. | |
| 2017/0027135 | A1 * | 2/2017 | Suntych | H05B 47/10 |

FOREIGN PATENT DOCUMENTS

| | | | |
|---|---|---|---|
| EP | 1196112 B1 | 3/2003 | |
| FR | 2423672 A2 * | 11/1979 | A01K 45/00 |
| FR | 2423672 A2 | 11/1979 | |
| WO | 01/03605 A1 | 1/2001 | |

OTHER PUBLICATIONS

First Office Action, including Search Report, for Chinese Patent Application No. 201780007211.X, dated Nov. 2, 2020, 23 pages.
International Search Report and Written Opinion for International Application No. PCT/EP2017/050886, dated Jun. 1, 2017, 8 pages.
European Search Report for European Patent Application No. 16 15 1757, dated Jul. 4, 2016, 2 pages.
Office Action, including Search Report, for related Brazilian Patent Application No. 112018012482-6, dated Mar. 26, 2021, 5 pages.
Edited by D. Whitvvorth et al., "Wild Birds and Avian Influenza: An introduction to applied field research and disease sampling techniques", FAO Animal Production and Health Manual, No. 5, Rome, ISBN 978-92-5-105908-1, http://www.fao.org/3/a1521e/a1521e.pdf, dated 2007, 120 pages.

* cited by examiner

METHOD, DEVICE AND SYSTEM FOR HANDLING, GRADING AND VACCINATING LIVING BIRDS

CROSS-REFERENCE TO RELATED APPLICATION

This Application is a Section 371 National Stage Application of International Application No. PCT/EP2017/050886, filed 17 Jan. 2017, and published as WO 2017/125387 A1 on 27 Jul. 2017, in English, the contents of which are hereby incorporated by reference in their entirety.

The present invention relates to devices, systems and methods for handling, grading and vaccinating living birds, like poultry, in particular, for handling, grading and vaccinating living birds by holding the birds by their scapula-humeral joint.

Most prior art systems that are build for hanging and unhanging of animals are designed for dead animals, and thus, do not take the welfare of the animals into consideration. However, different requirements have to be taken into consideration when handling living animals, like living poultry. Grading of breeders (living poultry) is of utmost importance in order to achieve homogeneous weight between groups, and ensuring better production during laying period. Current grading systems are manual, require intense workforce and/or are not suitable for living poultry as they are not designed to receive living poultry. That is, the prior art devices can injure the poultry or increase their stress level to an unhealthy amount.

Thus, there is a need for an automated device for hanging and unhanging birds, like poultry, which allows a higher throughput of the process, while ensuring the welfare of the birds.

The object of the invention is to provide a method, a system and a device for handling and grading of birds that overcomes one or more of the problems of the prior art. For that purpose, the anatomy, movements and reactions of the birds have been intensively studied and taken into consideration by reviewing of basic postulates of trigonometry and physics. With this input, a technical solution has been sought to manage the transport, handling, grading and vaccination of living birds, like poultry, ensuring their welfare.

The object is achieved with the features of the independent claims. The dependent claims relate to further aspects of the invention.

The present invention is based on the general idea of hanging living birds, like poultry, by their scapula-humeral joint in order for the birds to be further processed in an efficient and gentle way.

According to a first aspect of the present invention there is provided a device for handling and grading living birds, wherein the device comprises a main member; a receiving member rotatably attached to the main member and configured to receive and hold the birds by their scapula-humeral joint in a first position and to release the birds in a second position of the receiving member; and a locking member movably attached to the main member and configured to lock the receiving member in the first position and to unlock the receiving member to rotate the receiving member from its first position to its second position to release the birds.

The receiving member may comprise at least two substantially V-shaped members at a first end of the receiving member. The V-shaped members are preferably configured to hold a living bird by its scapula-humeral joint so that the wings of the living bird are spread out to the sides of the V-shaped members. The construction of the V-shaped members allows the living bird to be fixed in the receiving member while being in a comfortable position, thus securing the welfare of the bird, while being held by the receiving member. Preferably, each V-shaped member comprises an end part, at its free end not being attached to the receiving member, which is bent away from the receiving member (and the living bird) in order to prevent injuries of the living bird. The two end parts may comprise rounded ends to further increase safety for the bird.

Preferably, at least one of the V-shaped members is rotatably attached to the receiving member, so as to increase the space between the V-shaped members, to allow receiving birds of different sizes. In other words, the V-shaped members may be configured to allow receiving birds of different sizes by adjusting their opening space, preferably by being rotated in opposing direction at the end which is attached to the receiving member. Even though it would be sufficient to rotate one of the V-shaped members in a first direction away from the other V-shaped member, it is preferable that both V-shaped members are rotated in opposite directions in order to receive birds of different sizes.

The receiving member may be configured to rotate around a first axis and the at least one V-shaped member is configured to rotate around a second axis which is different from the first axis, e.g., perpendicular to the first axis, in order to open and close the space receiving the bird. That is, the receiving member has a first rotation axis to release the bird, whereas the second rotation axis for rotating the V-shaped member(s) is perpendicular to the first rotation axis. In other words, due to the anatomy of the bird, the bird is received by the at least two V-shaped members, which each have a rotation axis to open in a width direction of the bird, wherein the bird is then released by a rotation of the receiving member around an axis perpendicular to the rotation axis of the at least two V-shaped members, thus releasing the bird in a gentle way and onto their feet. It has been shown in practice that upon release, the birds start flapping their wings so that they land smoothly on the ground.

The receiving member may further comprises at least one limitation member to limit the rotation and thus the opening and closing of the at least one V-shaped member within a predetermined range. That is, in order to limit the possible rotation of the V-shaped member(s), limitation member(s) may be provided. The limitation member(s) may be provided to restrict the rotation to a maximum and/or to a minimum, i.e. to a maximum opening to receive large birds and/or to a minimum opening to receive smaller birds, respectively. In this way the rotation of the V-shaped member(s) can be restricted to a certain predetermined range to prevent uncontrolled rotation of the V-shaped member(s).

The receiving member preferably further comprises a counter weight member at a second part, for example at a second end of the receiving member, which is configured to rotate the receiving member from the second position to the first position after releasing the bird. That is, the receiving member may comprise a predetermined weight, preferably at one end thereof in order to allow for an automatic rotation of the receiving member back to the first position once the bird is released, where the receiving member is then able to receive a new bird. Preferably, the counter weight has a weight which is lighter than the birds being handled with the present invention to allow rotation from the first position to the second position due to the weight of the bird once the receiving member is unlocked, i.e., the weight of the counter weight depends on the birds being processed and may therefore be chosen according to individual needs.

The main member may comprise a hook member configured to attach the device to an external system, preferably to an automated handling and grading system. The hook member may be configured in a hook shape or a closed loop shape for easy attachment to the external system. However, other forms and configurations of the hook member are possible and mainly depend on the attachment means of the external systems. For example, the hook member may be an elongated member to be received by the external system using an intake member surrounding and fixing the elongated member. Other attachment configurations known in the art are possible as well.

The device may further comprise a back support configured to support the bird in a back region of the bird. The back support may secure the bird on the device and may mitigate the risk of the bird slipping out of the device. This may be particularly advantageous for securely retaining also smaller birds.

The back support may comprise or may consist of a plastic plate. The plastic plate may abut on the at least two V-shaped members. The plastic plate may be attached to the main member and/or the at least two V-shaped members so as to allow the receiving member to rotate between the first and second positions.

According to another aspect of the present invention a system for handling and grading birds, like poultry, is provided, preferably for grading birds according to their body weight. The system comprises at least one fixation member configured to attach at least one device for handling and grading living birds according to the present invention as outlined above. Preferably, a plurality, like twelve or more of such devices are attached to the system by means of respective fixation members. The system provides a carrier system including drive means and a path, preferably a closed loop, along which the at least one fixation member can travel. The system further comprises a weighing member configured to weigh the at least one device with the bird and at least two, preferably three, releasing members configured to automatically unlock the locking member according to the weight of the respective bird and thus release the receiving member to rotate from the first position to the second position to release the bird. The fixation member forms an attachment means of the system and is the counterpart to the above described hook member of the device for handling and grading living birds. Preferably, the system comprises releasing members at different positions, preferably three positions, of the path along which the fixation members travel in the system to release the birds according to their measured weight at a predetermined one of said, preferably three, positions to automatically sort the birds according to their weights.

The system may further comprise at least one vaccination member or station configured to allow vaccination of the birds while being held by the receiving member, before releasing the birds. Preferably, the vaccination member is configured to vaccinate only birds of a certain weight, i.e. after being weighed by the weighing member. It may also be advantageous to provide more than one vaccination member in order to vaccinate more than one bird at a time or to allow for individual vaccination of birds according to their weight.

The system may further comprise at least one counting member to count the birds, preferably according to their determined weight. The counting member may be provided as a separate unit or integrated into the weighing member. The counting member may be, e.g., a light barrier installed in one of the areas where the birds are released into according to their weight, thus, being able to detect each bird being released into a specific area, i.e. one of the three positions of the path along which the fixation members travel in the system.

The system may further comprise at least one processing device coupled to the weighing member. The at least one processing device may be configured to determine a weight of the bird based on an output signal of the weighing member and a tare weight of the device. The at least one processing device may be configured to automatically determine the tare weight in a calibration or taring procedure of the system. Alternatively or additionally, the at least one processing device may be configured to generate statistical information, such as a mean value, variance, or statistical distribution pattern, of a weight distribution of a plurality of birds. The statistical information may be output to an operator and/or may allow the system to automatically set one or several delimiter weights for grading.

According to another aspect of the present invention a method for handling and grading birds, like poultry, is provided. The method comprises the steps of: receiving and holding a bird by its scapula-humeral joint in a first position by a receiving member; rotating the receiving member around a first axis from the first position to a second position and thereby releasing the bird, and rotating the receiving member around the first axis from the second position back to the first position.

The method may further comprise locking the receiving member in the first position by a locking member. The locking member may be configured as outlined above.

Preferably, receiving and holding the bird comprises rotating at least one of two V-shaped members around a second axis, which is different from the first axis, e.g. perpendicular to the first axis, so as to open the gap and/or increase the space between the two V-shaped members so as to adapt it to the size of the birds to be handled.

Rotating the at least one of the V-shaped members may comprise rotating the at least one of the V-shaped members within a predetermined range using at least one limitation member. The limitation member may be configured as outlined above.

Rotating the receiving member around the first axis from the second position to the first position preferably comprises automatically rotating the receiving member around the first axis from the second position to the first position using a counter weight member attached to a second end of the receiving member. The counter weight member may be configured as outlined above.

The method may further comprise a step of attaching the receiving member and the locking member to an external system, preferably to an automated handling and grading system as described above.

The receiving member and locking member may be attachable to the external system by means of a click connection, for example.

Preferably, the method further comprises at least one of the following steps: a step of automatically determining the weight of a bird, a step of automatically grading the bird corresponding to the determined weight of the bird, a step of automatically counting the birds, preferably corresponding to the determined weight of the bird, and a step of automatically vaccinating the bird while being held by the receiving member. The step of automatically counting the birds may be executed by the use of a counting member or by the weighing member, i.e. the counting may be done by the weighing member or a separate counting member.

The method may further comprise a step of processing the determined weight of the bird to generate statistical information on a weight distribution of a plurality of birds. For illustration, one or plural characteristics of the statistical distribution may be determined. The characteristics may include a mean value, variance, mean width, or a distribution indicating the fraction of a sample group of birds respectively falling within each one of several weight intervals. The method may further comprise setting at least one delimiter weight for grading birds based on a user input and/or the generated statistical information on the weight distribution.

Some preferred embodiments are now described with reference to the drawings. For explanation purpose, various specific details are set forth, without departing from the scope of the present invention as claimed.

FIGS. 1, 2a to 2c and 3 illustrate a device of the present invention according to one exemplary embodiment, wherein FIG. 1 is a perspective view, FIG. 2a is a front view, FIG. 2b is a side view, FIG. 2c is a top view and FIG. 3 is an exploded view. The following description is made with reference to FIGS. 1, 2a to 2c and 3.

Figure 1:
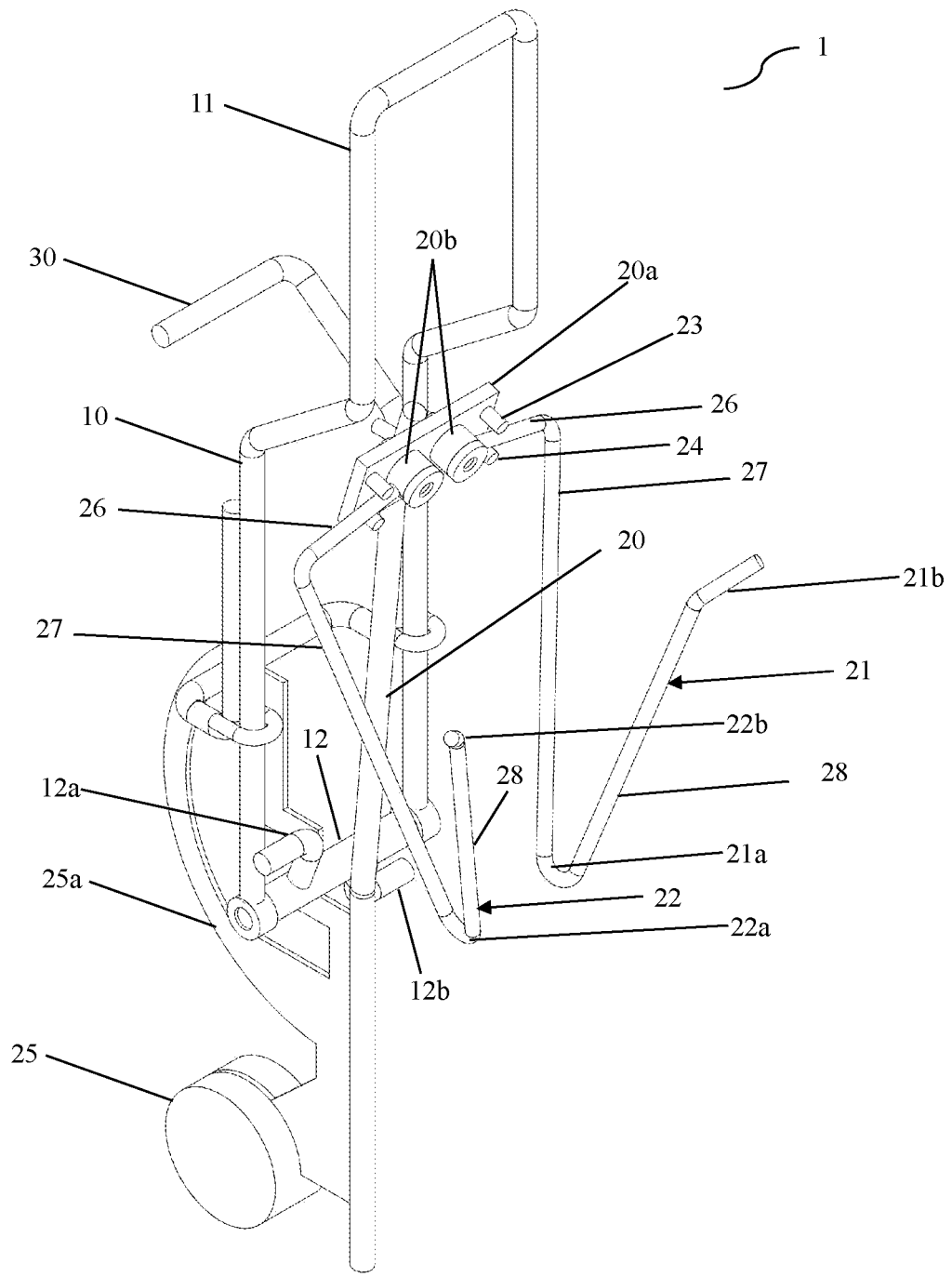
FIG. 1 is a perspective view of an embodiment of the present invention.

In particular, FIGS. 1, 2a to 2c and 3 show a device 1 for hanging and grading living birds, like poultry, with a main member 10 comprising a hook member 11. In this embodiment, the hook member 11 and the main member 10 are constructed as one integral member, but the hook member 11 may also be attached to the main member 10. FIGS. 1, 2a to 2c and 3 further show a receiving member 20, which is rotatably coupled to the main member 10 by a horizontal portion 12 essentially perpendicularly attached to the receiving member 20. The corresponding first rotation axis A of the receiving member 20 is indicated by the dashed line. In addition, the Figures show a locking member 30 and a counter weight member 25, wherein the counter weight member 25 may be attached to the receiving member 20 and the locking member 30 may be attached to the main member 10. Furthermore, two protrusions 12a and 12b are coupled to the receiving member 20, preferably to the horizontal portion 12 of the receiving member 20, to restrict the rotation of the receiving member 20.

Figure 2A:
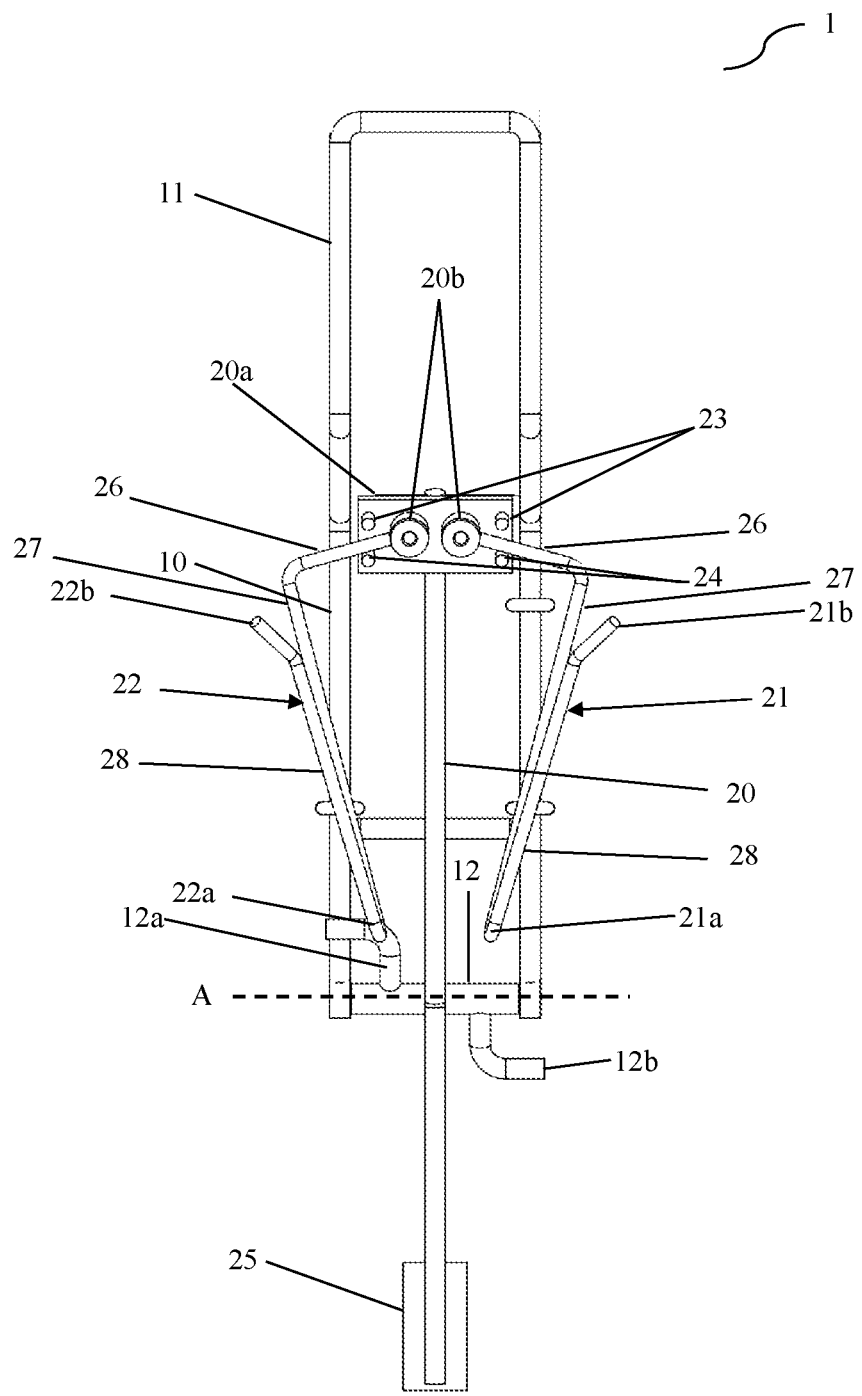
FIG. 2a is a front view of the embodiment of FIG. 1.
Figure 2B:
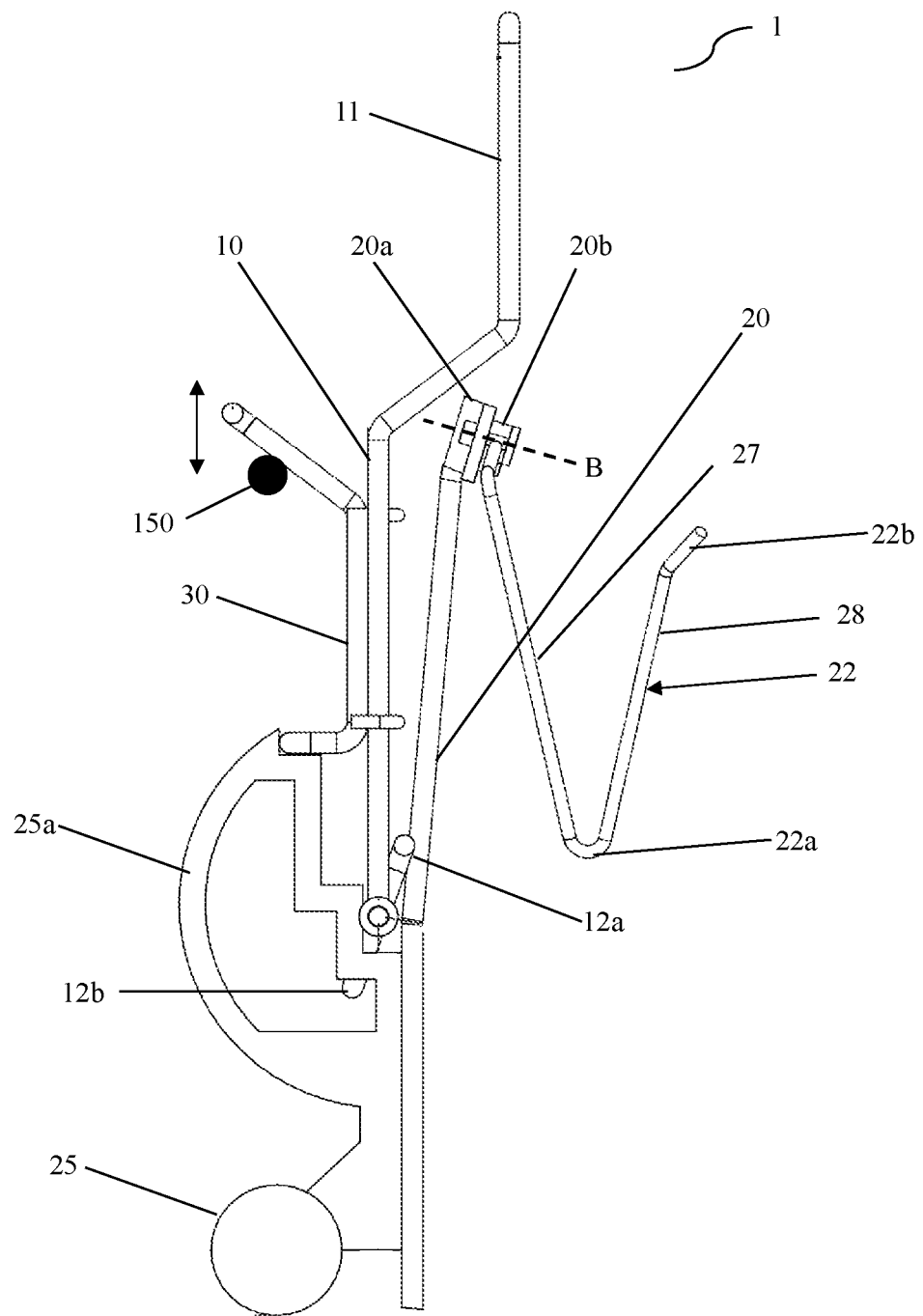
FIG. 2b is a side view of the embodiment of FIG. 1.

As shown by FIGS. 1, 2a to 2c and 3, the receiving member 20 further comprises two essentially V-shaped members 21, 22, each having an elongate portion 26, a first leg 27 extending downward from the elongate portion 26, a bend portion at the end of the first leg 27 (21a and 22b, respectively), and a second leg 28 extending upwardly from the bend portion. The V-shaped members are bent at bed portions 21b, 22b in a way so that the end parts are pointing away from the device, preferably bending away from any body parts of a living bird received therein. The substantially V-shaped members 21, 22 are rotatably coupled to the receiving member 20 so as to open and close the angle between the two V-shaped members 21, 22 to allow receiving birds of different size. The respective rotation axis B is indicated in FIG. 2b. At the connection point of the V-shaped members 21, 22, the receiving member 20 may comprise a plate like member 20a and two fixation members 20b defining the rotation axis attached thereto, which are configured to rotatably couple the V-shaped members 21, 22 to the plate like member 20a, and thus, to the receiving member 20. In this embodiment the rotation axis of the two V-shaped members 21, 22 are offset a certain distance but may also be congruent to form a single axis.

The V-shaped members 21, 22 are illustrated as two members, however it will be appreciated by the skilled person that the V-shaped members may be constructed as a plurality of members. For example, each of the V-shaped members 21, 22 may comprise two essentially parallel V-shaped members in close proximity to allow better fixation of the birds. In other words, the structure of each of the V-shaped members 21, 22 may comprise a double structure.

More particularly, the V-shaped members 21, 22 may each comprise elongated portions 26 which extend sideways of the device 1 from the ends coupled to the plate like member 20a (e.g. FIG. 2a). The elongated portions 26 may be bent by approximately 90° to transition into first legs 27 extending towards the bottom of the device 1. Bend portions 21a, 22a at the end of the first legs 27 are provided to receive the bird at its scapula-humeral joint. In order to allow securely holding the bird and at the same time allow easy release of the bird, the bend portions 21a, 22a are bent between approximately 100° to 170°, preferably between approximately 120° to 150° and more preferably between approximately 130° to 140° (FIG. 2b). The V-shaped members 21, 22 further extend from the bend portions 21a, 22a towards the open end parts 21b, 22b. The portion between the bend portions 21a, 22a and the open end parts 21b, 22b may be substantially straight and referred to as second legs 28.

The plate like member 20a further comprises two limitation members 23, 24 for each V-shaped member 21, 22. The limitation members 23, 24 are attached to the receiving member 20 such that the rotation of the V-shaped members 21, 22 is restricted within a predetermined range in order to prevent uncontrollable rotation or oscillation of the V-shaped members 21, 22. The limitation members 23, 24 may be protrusions extending from the plate like member 20a close to the coupling point (fixation members 20b) of the plate like member 20a and the V-shaped members 21, 22.

As can best be seen from FIG. 2a, the V-shaped-members 21, 22 are restricted in their rotational movement by the limitation members 23, 24. In the basic position the bend portions 21a, 22a point towards each other under a predetermined angle set by the bottom restriction members 24. Due to rotation of the V-shaped members 21, 22 in opposite directions, the bend portions 21a, 22a are rotated away from each other as far as the top restriction members 23 allow. FIG. 2a further illustrates the preferred orientation of the open end parts 21b, 22b. In particular, the open end parts 21b, 22b are pointing away from the device 1, and thus from any body parts of the bird.

Figure 2C:
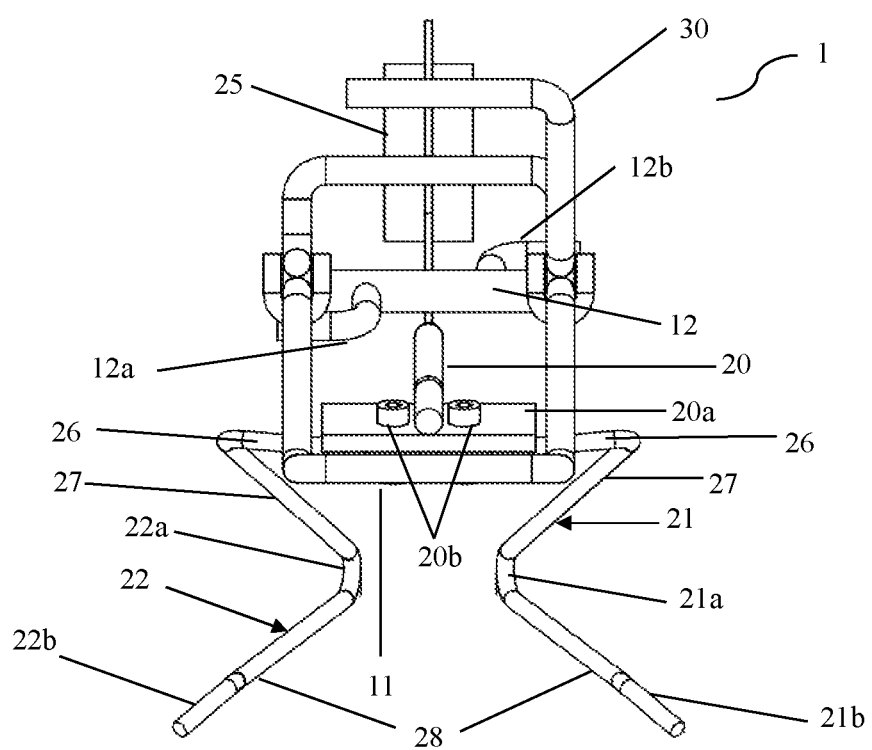
FIG. 2c is a top view of the embodiment of FIG. 1.

The configuration of the V-shaped members 21, 22 in the basic position can also be seen from FIG. 2c. The distance between the first leg 27 of one V-shaped member 21 to the first leg 27 of the other V-shaped member 22 decreases towards the bend portions 21a, 22a. The distance between the second leg 28 of one V-shaped member 21 to the second leg 28 of the other V-shaped member 22 also decreases towards the bend portions 21a, 22a. However, when rotating the V-shaped members 21, 22, the legs may become parallel to each other or the distance between them may even increases towards the bend portions 21a, 22a.

The locking member 30 is moveably attached to the main member 10 and locks the receiving member 20 in a first position (original position), in which the receiving member 20 is able to receive birds, which is hung by their scapula-humeral joint at the bends 21a, 22a of the V-shaped members. In this configuration, the second legs 28 of the V-shaped members 21, 22 are pointing upwards, thus holding the bird. The locking member 30 in this embodiment is moveable in an up direction, thereby unlocking or releasing the receiving member 20. Upon releasing of the receiving member 20 by moving the locking member 30 in the up direction, the receiving member 20 rotates to a second position (releasing position) due to the weight of the bird since the weight of the bird > weight of counter weight member 25. The second legs 28 of the V-shaped members 21, 22 are pointing downwards in the second position, thus releasing the bird. The maximum rotation of the receiving member is set by the protrusions 12a and 12b. After release of the bird, the receiving member 20 rotates back to its original position due to the weight of the counter weight member 25. Finally, the locking member 30 is moved down to lock the receiving member 20 in its original position. The movement of the locking member 30 is indicated by the arrows in FIG. 2b.

Releasing the bird from the receiving member 20 is preferably done by a rotation of the receiving member 20 so that the V-shaped members 21, 22 approach the ground. This way the bird is released from a height that is lower than the height the bird is held in the first position (original upright position). Thus, the bird can easily land on its feet when being released from the receiving member 20, typically moving and flapping its wings.

Releasing the bird from the receiving member 20, i.e. from the V-shaped members 21, 22, is supported by the shape of the V-shaped members 21, 22. That is, when reaching the releasing position, the bird automatically slides out of the V-shaped members 21, 22.

It is preferred that the receiving member 20 comprises a recess, into which the locking member 30 can be engaged to lock the receiving member 20 in its original upright position.

The counter weight member 25 is attached to the receiving member 20 to allow the receiving member 20 to be rotated back to its original position, once the bird has been released from the receiving member 20 (as described above). In particular, the counter weight member 25 may be configured to allow a rotation of the receiving member 20 from the first position to the second position when a bird is being held by the V-shaped members 21, 22 and to allow a rotation of the receiving member 20 from the second position to the first position after the bird is released. This may be achieved by considering the position of the rotation axis, the position and weight of the counter weight member 25 and the expected weight range of the bird to be received by the device.

The counter weight member 25 may be attached to the receiving member by a flat portion 25a, which comprises the above mentioned recess into which the locking member 30 can be engaged to lock the receiving member 20 in its original upright position.

Figure 3:
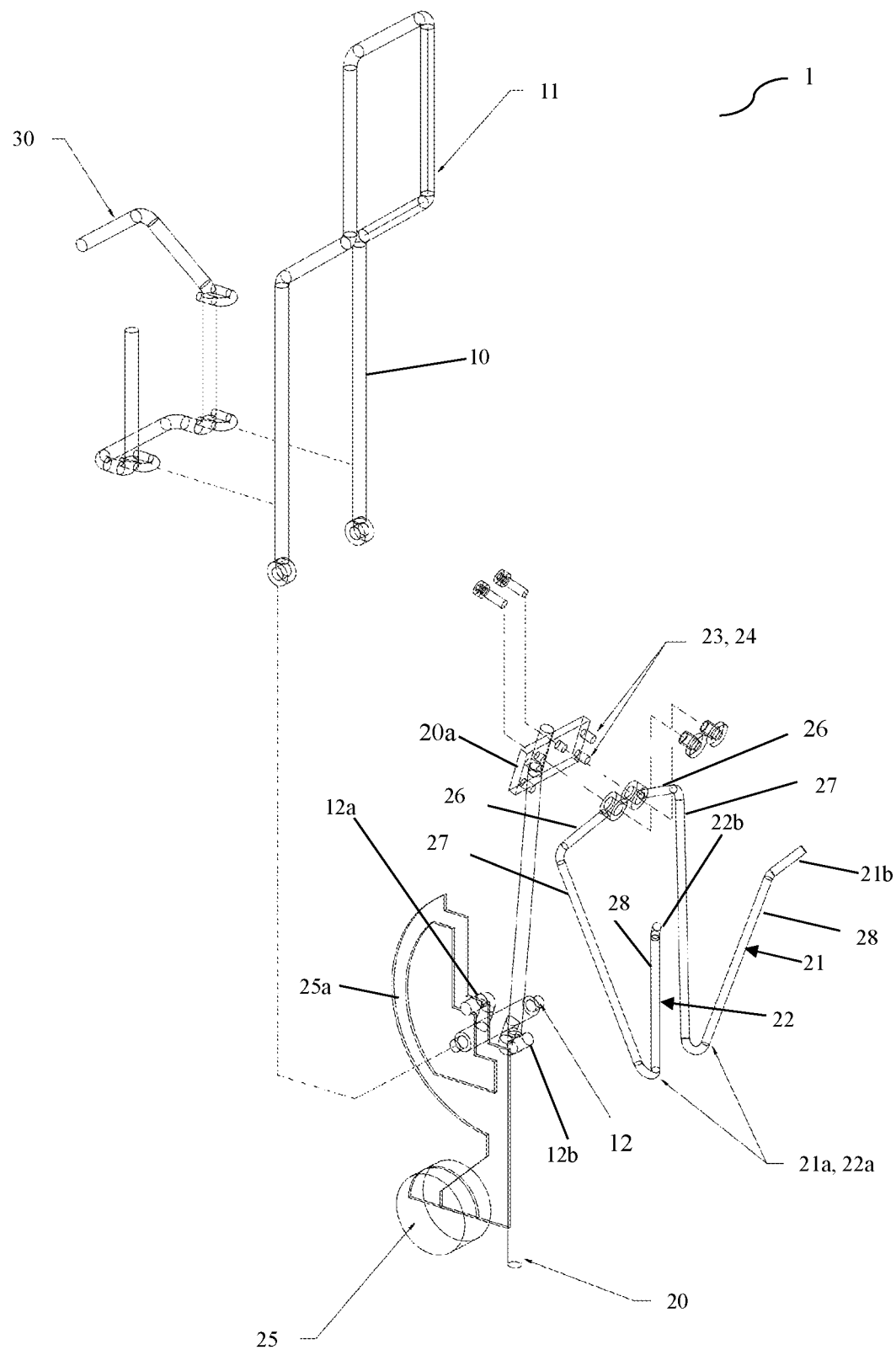
FIG. 3 is an exploded view of the embodiment of FIG. 1.

FIG. 3 illustrates an exploded view of the device 1. In particular, the plate like member 20a comprises of two holes, which are brought in line with two holes at the end of the elongated portions 26 of the V-shaped members 21, 22. Attachment members are then introduced through the holes to fix the V-shaped members 21, 22 to the plate like member 20a.

Figure 4:
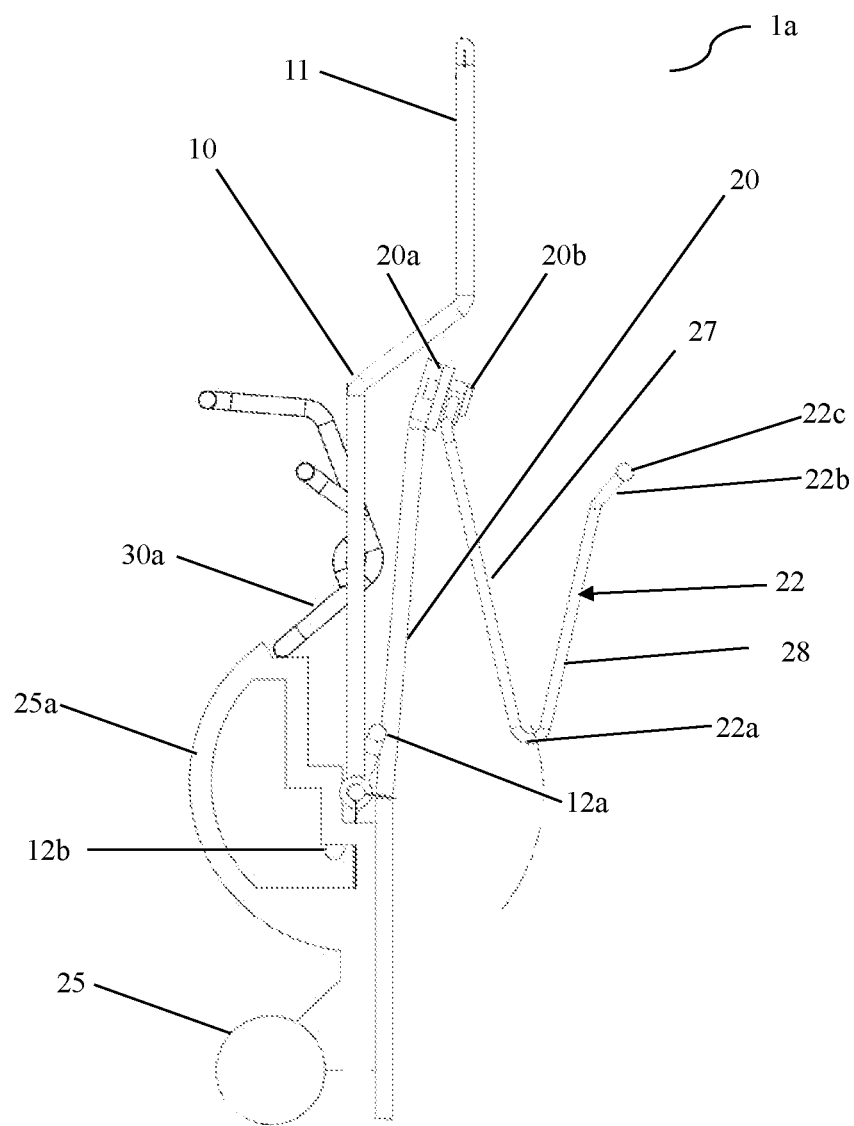
FIG. 4 is a side view of another embodiment of the present invention.
Figure 4A:
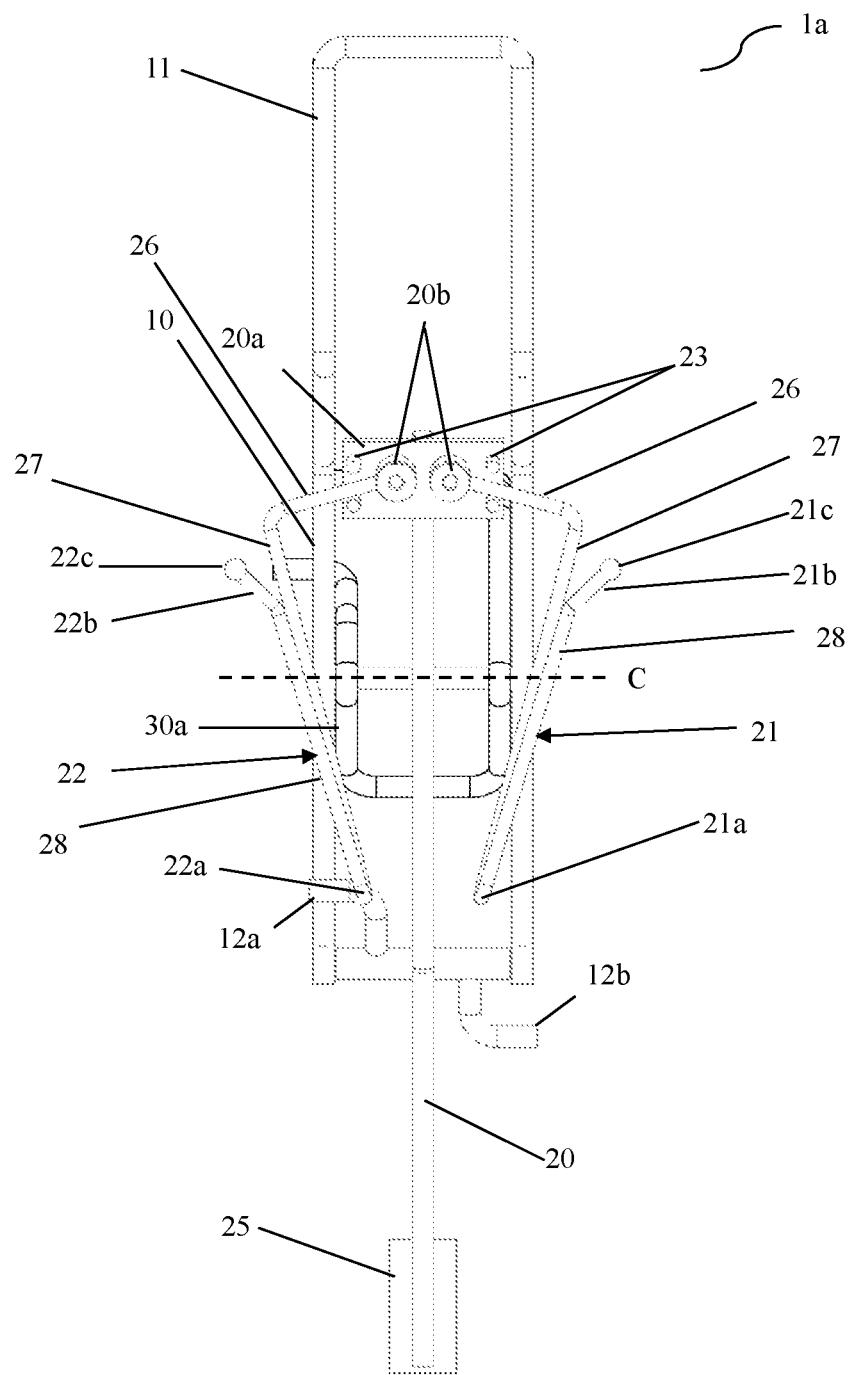
FIG. 4a is a front view of the embodiment of FIG. 4.

FIGS. 4 and 4a show an alternative embodiment of a device 1a according to the present invention. The parts of this alternative embodiment that are equivalent to the ones already described with reference to FIGS. 1, 2a to 2c and 3 are indicated by corresponding reference signs. In the following, only those parts are described, which differ from the parts described with respect to FIGS. 1, 2a to 2c and 3.

In particular, FIG. 4 shows a side view of an alternative construction of the locking member 30a and rounded end parts 21c, 22c (rounded end part 21c is not visible in FIG. 4 but only in FIG. 4a), which shows a front view according to the embodiment of FIG. 4.

The locking member 30a is movable attached to the main member 10, however, the movement of the locking member 30a according to this embodiment is a rotational movement around a rotation axis. The rotation axis C (dashed line in FIG. 4a) is preferably parallel to the rotation axis of the receiving member 20. The rotation of the locking member 30a in a first direction allows for a rotation of the receiving member 20 to release the bird. After the receiving member 20 rotates back to its original position due to the counter weight member 25, the locking member 30a rotates back to lock the receiving member in its original position.

Furthermore, the V-shaped members 21, 22 comprise rounded end parts 21c, 22c. The rounded end parts 21c, 22c substantially have a ball shape and are located at the free ends of the V-shaped members 21, 22, which are not connected to the receiving member 20. The rounded end parts 21c, 22c decrease the risk of injuries of the birds while being received, held, and released by the receiving member 20.

The alternatives introduced by FIG. 4 can both be independently incorporated into the embodiment of FIGS. 1, 2a-2c and 3, i.e. it is possible to incorporate all of the features of FIG. 4 into the foregoing embodiment or to incorporate them separately.

Figure 5:
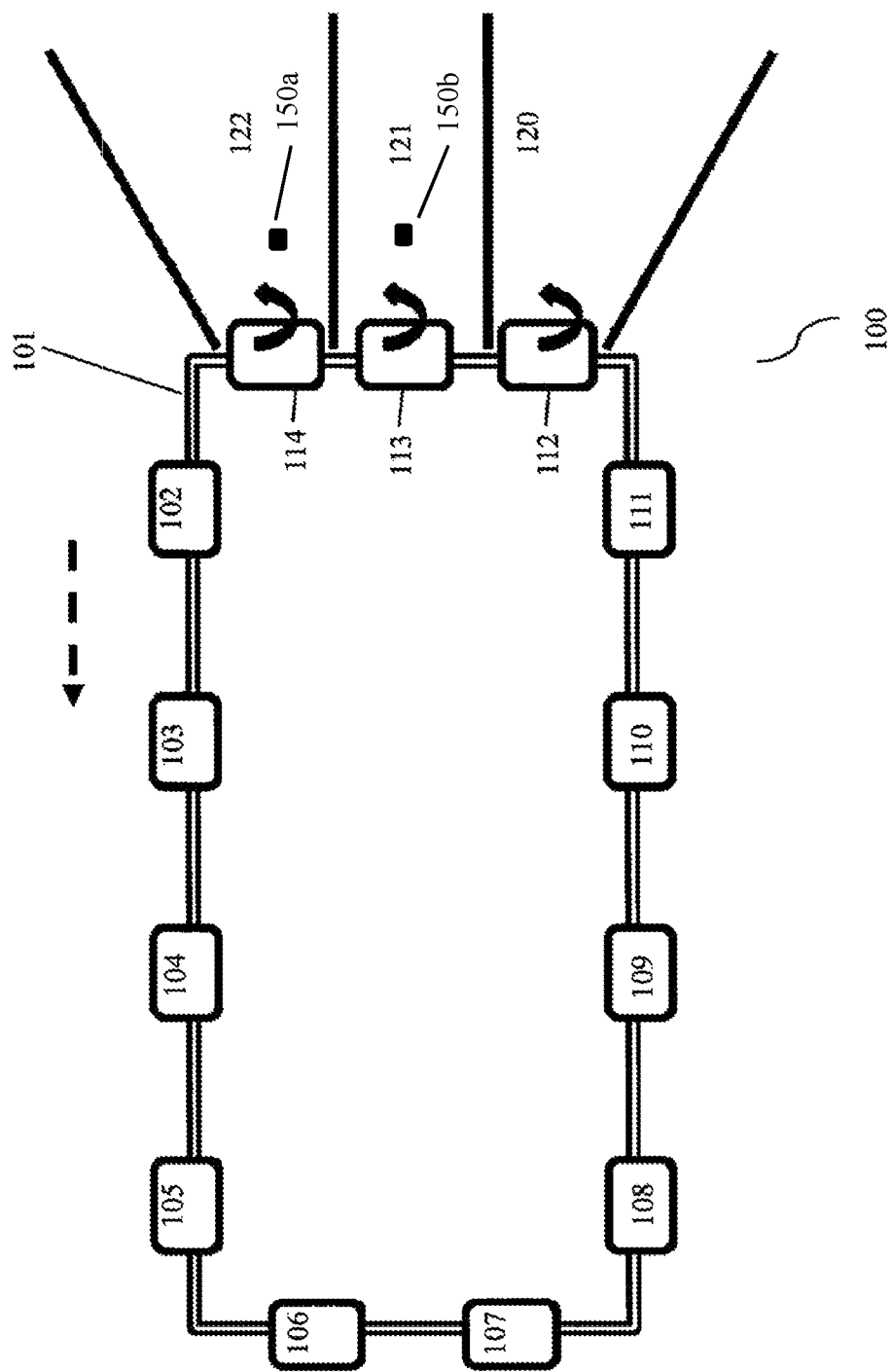
FIG. 5 is a top view of a system according to an embodiment of the present invention.
Figure 6:
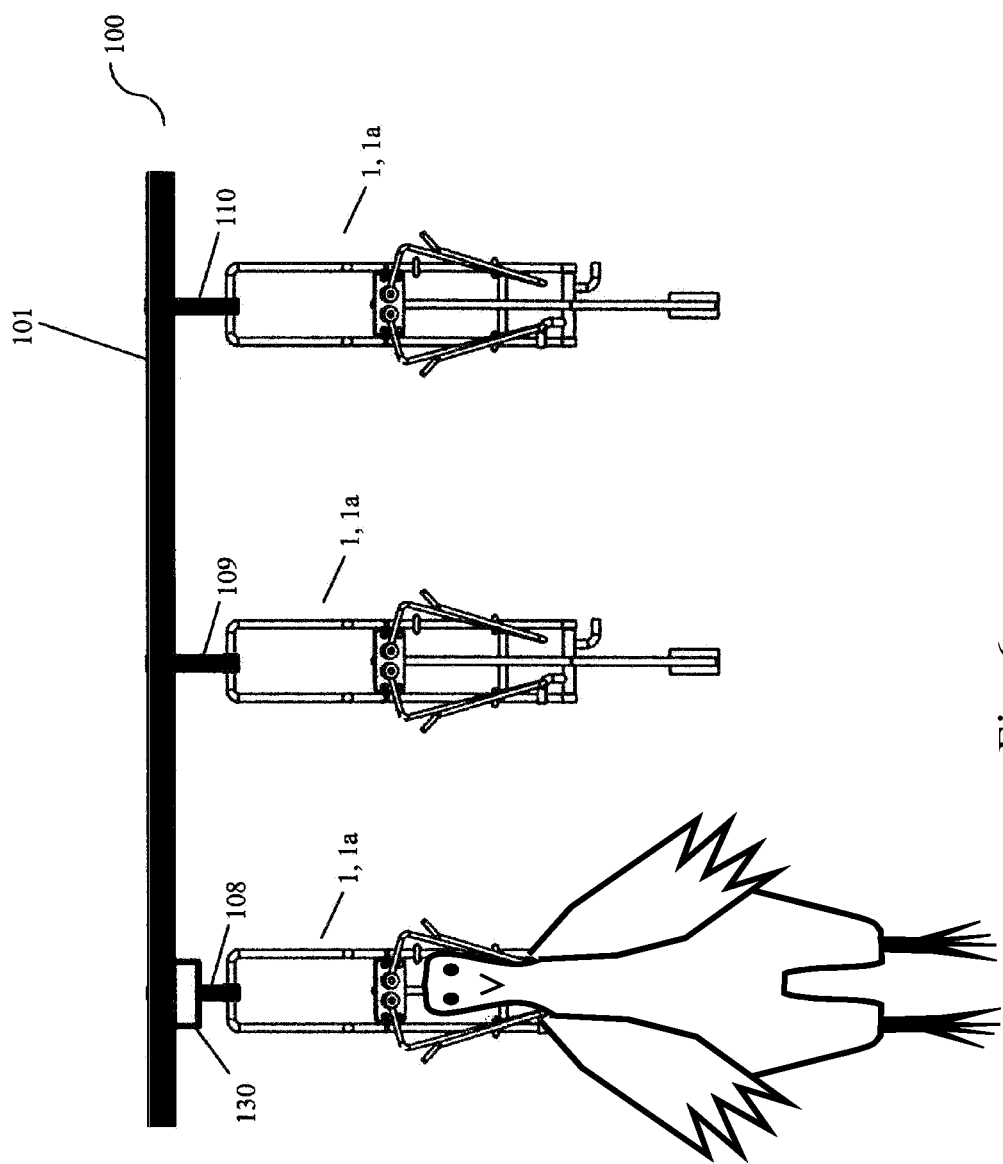
FIG. 6 is a side view of the system of the embodiment of FIG. 5.

FIGS. 5 and 6 show a system 100 for handling, grading and vaccinating birds according to an embodiment of the present invention, wherein FIG. 5 shows a top view and FIG. 6 shows a side view of said system 100.

FIG. 5 shows a carrier system 101 to which a plurality of fixation members 102-114, which can engage with the previously described devices for handling and grading birds, are attached. Even though a plurality of thirteen fixation members 102-114 are shown, it is clear for the skilled person by the present description that only one fixation member may be sufficient for the present invention, i.e. the number of fixation members 102-114 is for illustrative purposes only. The carrier system 101 allows for an automatic movement of the fixation member 102-114 along a path in one direction (illustrated by the dashed arrow), preferably by means of a motor (not shown), to provide a closed loop.

FIG. 5 further shows three predetermined positions, i.e. areas 120, 121, 122, at which the birds may be automatically released (indicated by the arrows) depending on their weight. That is, the system measures the weight of each bird by the use of a weighing member (described later) and releases the bird either in area 120, 121 or in area 122 depending on its determined weight. The number of predetermined areas is however not restricted to three areas 120, 121, 122 and may be at least two areas. In order to release the bird, i.e. to move the locking member 30 as described above, the system 101 comprises a releasing member 150a, 150b (collectively designated by 150 in FIG. 2b) at the two positions where the bird is supposed to be released. The releasing members 150a, 150b are preferably automatically controlled based on the measured weight and cause a movement of the locking member 30.

As can be seen schematically from FIG. 6, the devices 1, 1a are received by the fixation members 102-114 (here only 108-110 are shown exemplarily). In addition, FIG. 6 shows a weighing member 130, which is configured to weigh the birds received in the device 1, 1a. A weighing member 130 may be attached to each fixation member 102-114 (not shown) so as to measure the weight of the respective bird or individual fixation members may be attached to the carrier system 101 at a predefined position, so that the device 1, 1a passing that position is being weighed, so as to measure the weight of the bird received by said specific device.

It is further preferred that the system 100 comprises at least one automatic injection device (not shown) or vaccination station (not shown) at one or more predetermined positions of the system 100. The injection device may be configured to vaccinate the bird while being fixed by the device 1, 1a. The vaccine is preferably injected into the chest of the bird, which is exposed to the front of the device 1, 1a, i.e. the chest of the bird is not blocked by any parts of the device 1, 1a. The same or further vaccination stations may be provided for the eyes, the neck and/or the wings of the birds, which are all freely accessible when the birds are received by the devices 1, 1a.

Figure 7:
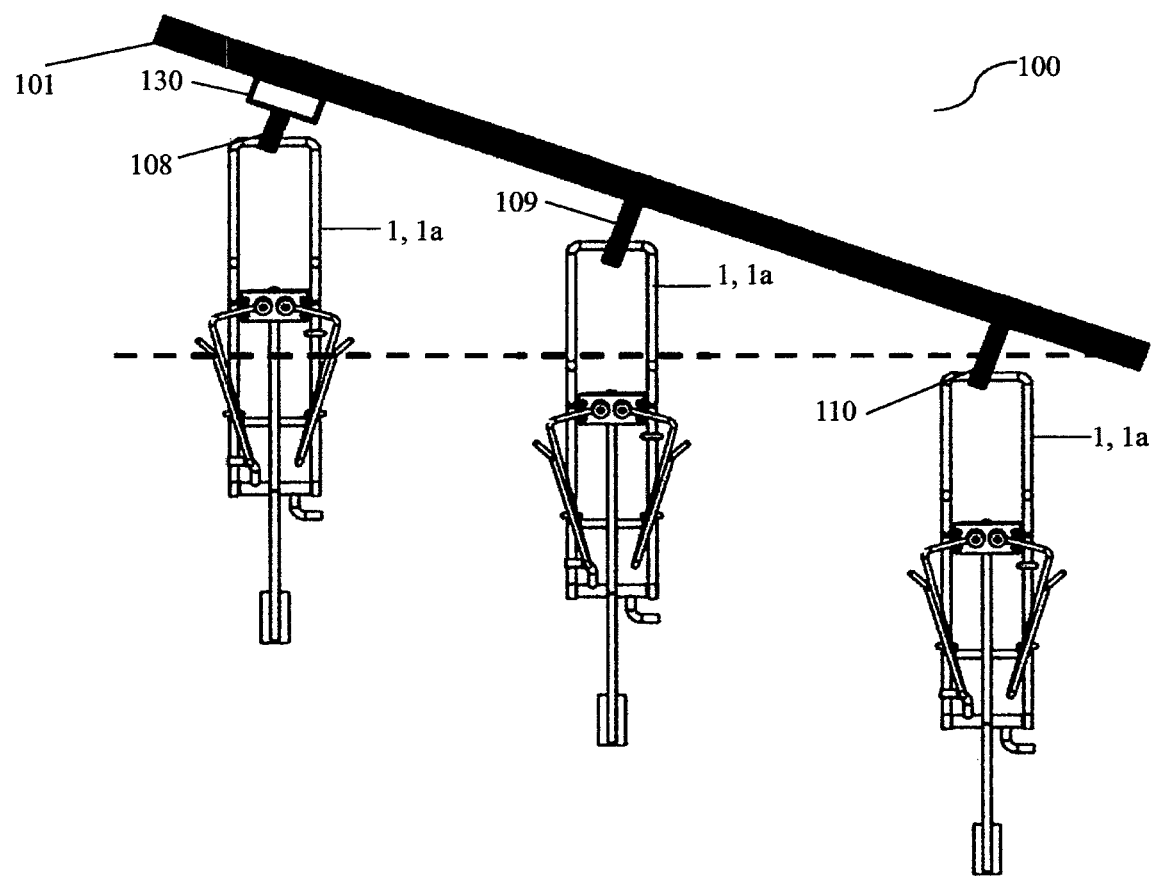
FIG. 7 shows a further embodiment of the system according to FIG. 5 and FIG. 6.

FIG. 7 shows a further embodiment of the system according to FIGS. 5 and 6. As shown by FIG. 7, the system 100 may be configured to be rotated or tilted from a horizontal configuration (as shown in FIG. 6) to a more vertical configuration in order to save space during storage or transport. It is preferred that the angle away from the horizontal configuration (dashed line) may be continuously varied up to a complete vertical configuration (90° with respect to the dashed line). It is further preferred that during the tilting movement the devices 1, 1a attached to the fixation members 102-114 are kept horizontally, preferably due to their own weight. This configuration is advantageous in places where space is sparse or for the transportation of the system 100. Preferably, a pneumatic system is used to allow the automatic adjustment of the degree of inclination of the system 100. The system 100 may be rotated at one of the sides of the system 100 as shown by FIG. 7 or around a center axis, preferably at the center of the system 100.

In any one of the embodiments described above, a support plate configured to support the bird in a back region of the bird may be provided, as will be explained in more detail with reference to FIG. 8.

Figure 8:
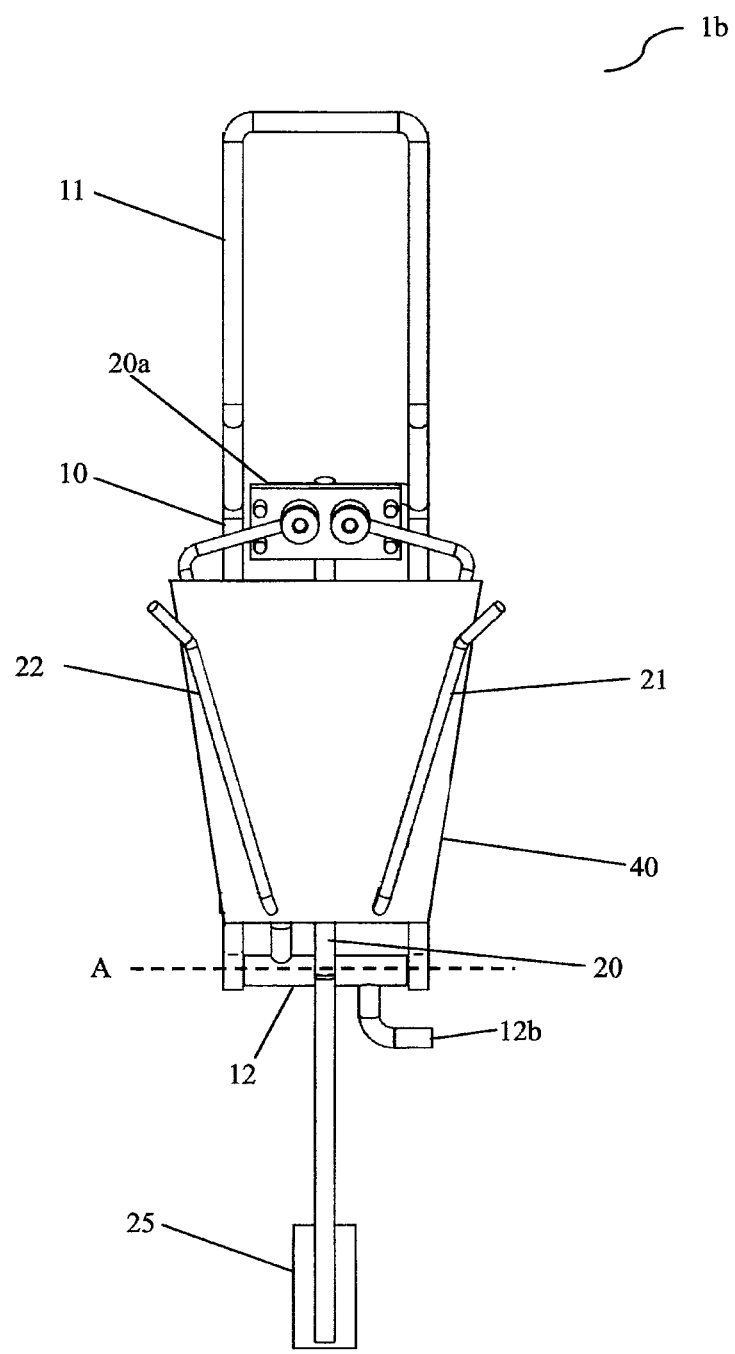
FIG. 8 is a front view of an embodiment of the present invention.

FIG. 8 shows a device 1b for hanging and grading living birds. The device 1b may have any one of the configurations described above. For illustration, the device 1b comprises a main member 10 comprising a hook member 11, a receiving member 20 that may comprise at least two V-shaped members, and a locking member (not shown in FIG. 8). The device 1b may comprise a back support 40. The back support 40 may be configured to support the bird in a back region of the bird. When the bird is received by the receiving member 20, the back support 40 may secure the bird so as to mitigate the risk of the bird slipping out of the device. This may be particularly advantageous for securely retaining also smaller birds.

The back support 40 may comprise or may consist of a plastic plate. The plastic plate may abut on the at least two V-shaped members 21a, 21b of the receiving member. The plastic plate may be attached to the main member 10 and/or the at least two V-shaped members 21a, 21b so as to allow the receiving member 20 to rotate between the first and second positions. The plastic plate may be attached to the main member 10 and/or the at least two V-shaped members 21a, 21b so as to allow at least one of the V-shaped members 21a, 21b to rotate about the second axis B depicted in FIG. 2b, to accommodate different bird sizes. The device 1b may have any one or any combination of other optional features described above. Elements that correspond, with regard to their configuration and/or operation, to elements already described above are designated with the same reference signs in FIG. 8.

Figure 9:
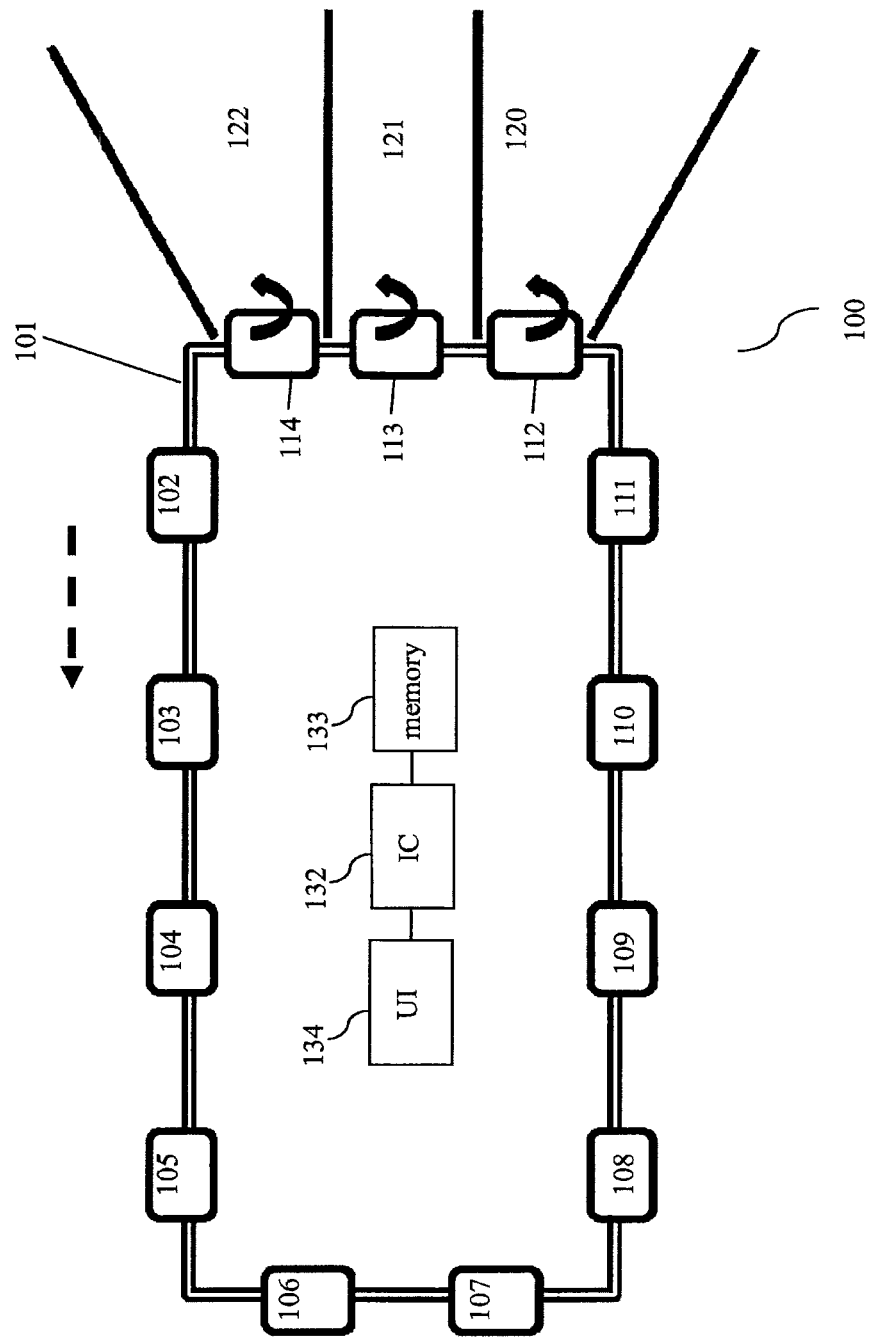
FIG. 9 is a top view of a system according to an embodiment of the present invention.

FIG. 9 shows a system 100 according to an embodiment. The system 100 may have a construction and operation that is similar to the system 100 described with reference to FIG. 5 to FIG. 7. The system 100 may comprise a processing device comprising at least one integrated circuit 132. The processing device may be configured to automatically process an output signal of the weighing member 130 to determine the weight of a bird. The processing device may determine the weight of a bird by subtracting a tare weight of the device 1, 1a, 1b from the combined weight of the device 1, 1a, 1b and the bird retained therein. The processing device may be configured to automatically determine the tare weight of the device 1, 1a, 1b, e.g., in a calibration or taring procedure.

The processing device may be configured to perform additional processing and control operations based on the bird weight. The processing device may be configured to generate statistical information of a weight distribution of a plurality of birds. The statistical information may be stored in a memory 133 and/or output via a user interface 134. The statistical information may be output to an operator and/or may allow the system to automatically set one or several delimiter weights for grading. The statistical information may include a mean value, variance, mean width, or a distribution indicating the fraction of a sample group of birds respectively falling within each one of several weight intervals. For illustration, a bar diagram illustrating the fraction of birds falling within respective weight intervals may be computed and output via the user interface 134.

The statistical information may be used for grading. For illustration, one or several delimiter weights may determine into which one of at least two regions 120, 121, 122 the bird is released. The weight of a bird may respectively be compared to one or several delimiter weights to determine the region 120, 121, 122 in which the bird is to be released. The processing device of the system 100 may be configured to automatically set the delimiter weights based on the statistical information obtained by sampling a plurality of bird weights. The delimiter weights may be set based on the statistical information so as to ensure that desired fractions or desired numbers of birds are subsequently released into each one of the regions 120, 121, and 122, respectively depending on the bird weight. Alternatively or additionally, the delimiter weights may be set by a user input received at the user interface 134. Based on the delimiter weights and the statistical information on the weight distribution, the processing device may automatically determine the fraction of birds that will be released in respectively each one of at least two regions 120, 121, and 122, to assist the operator in setting appropriate delimiter weights.

In operation of the system 100, taring may be performed to determine the tare weight of the device 1, 1a, 1b without a bird. A sampling procedure may be performed thereafter, to obtain statistical information on the bird weights of a sample group of birds. The information on the statistical distribution of bird weights may be output or stored, for example. Delimiter weights may be computed in various ways. For illustration, the user interface 134 may allow the operator to indicate the fraction of animals that are to be respectively assigned to each one of plural types, which may correspond to release regions 120, 121, and 122, for example. The system 100 may automatically compute the delimiter weights based on the statistical distribution obtained during sampling and the desired fractions specified by an operator input. Alternatively or additionally, the system 100 may allow the operator to specify the total number of animals and the numbers of animals that are to be assigned to respectively each one of plural types, which may correspond to release regions 120, 121, and 122, for example. The system 100 may automatically compute the delimiter weights based on the statistical distribution obtained during sampling and the numbers specified by the operator via the user interface 134. Automatic weighing and grading of the birds may be performed thereafter, using the delimiter weights. Additional operations may be performed by system 100. For illustration, the system 100 may comprise a vaccination member, as explained above.

Figure 10:
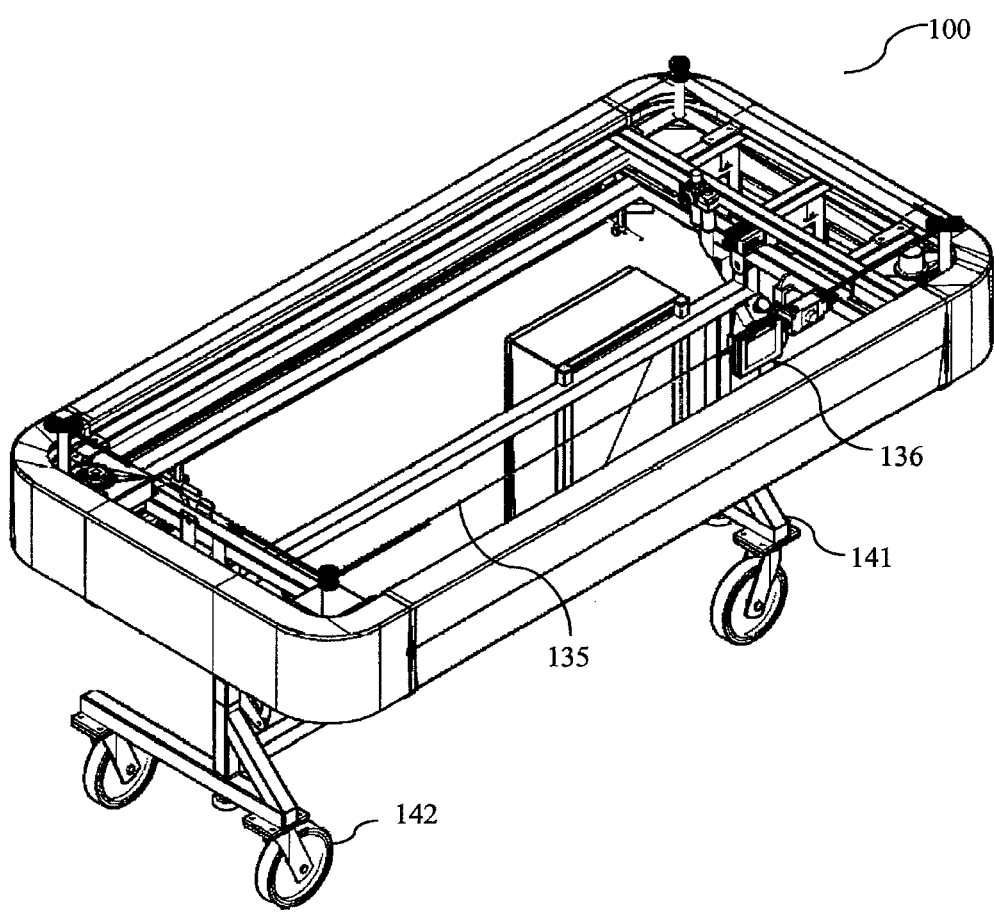
FIG. 10 is a perspective view of a system according to an embodiment of the present invention.

FIG. 10 is a schematic perspective view of a system 100 according to an embodiment. The system 100 schematically illustrated in FIG. 9 is configured as a mobile system. The system 100 comprises a frame 141 configured to allow the system 100 to be easily displaced. The frame 141 may include rollers, wheels 142 or other elements that facilitate displacement of the system 100.

The user interface 134 of the system 100 may have any one of a variety of configurations. For illustration, the user interface 134 may include a safety element 135 that may extend around at least part of the circumference of the system 100. The safety element 135 may be configured as a safety wire. The safety element 135 may extend about the entire circumference of the system 100. Actuation of the safety element 135, e.g., by pulling, may cause operation of the system 100 to be paused. The user interface 134 may additionally or alternatively include interface elements such as a touch screen 136, a safety switch, or a footswitch. For illustration, the footswitch may be operable to control a vaccination procedure and/or a transport speed of the birds in the system 100. The system 100 may include a conveyor (not shown) configured to engage a device 1, 1a, 1b according to an embodiment. The conveyor may be an endless conveyor, operative to transport the device 1, 1a, 1b circumferentially about the system 100.

The devices, systems, and methods disclosed herein may be used to sort a plurality of birds into two, three, or more than three sub-populations of different average weight. This allows each group to be managed in a way that will result in continued uniformity of bird weights within the sub-population. The devices, systems, and methods disclosed herein may be configured to facilitate grading of birds by bodyweight, for example, to enhance flock uniformity by sorting a plurality of birds into two, three, or more than three sub-populations. Variability in rate of sexual maturation, which may be caused by inhomogeneous body weights within a flock of birds, can be a major limitation to achieve a high rate of egg production, for example. The devices, systems, and methods disclosed herein allow the birds in each one of plural sub-populations of different average weight to be fed or otherwise treated in a manner that is tailored to enhance animal welfare for birds having the weight associated with the respective sub-population.

The devices, systems, and methods disclosed herein may allow grading to be performed more efficiently. The devices, systems, and methods disclosed herein may be configured to improve ergonomic conditions for operators of the system, e.g., as compared to manual grading processes.

The devices, systems, and methods disclosed herein may also offer the capability to perform an automatic data collection for every single bird in each of the at least two sub-populations. The respective weight information may be used as management information, e.g., when determining the feed quantity for birds of each of the sub-populations, and/or for evaluating the degree of uniformity within each of the sub-populations. The devices, systems, and methods disclosed herein may also offer the capability to mitigate the risk of inaccurate counting of birds in each of the sub-populations, which would otherwise lead to the assignment of incorrect feed quantities.

As the present invention may be embodied in several forms without departing from the scope or essential characteristics thereof, it should be understood that the above-described embodiments are not limited by any of the details of the foregoing descriptions, unless otherwise specified, but rather should be construed broadly within the scope as defined in the appended claims, and therefore all changes and modifications that fall within the present invention are therefore intended to be embraced by the appended claims.

Furthermore, in the claims the word "comprising" does not exclude other elements or steps, and the indefinite article "a" or "an" does not exclude a plurality. A single unit may fulfil the functions of several features recited in the claims. The terms "essentially", "about", "approximately" and the like in connection with an attribute or a value particularly also define exactly the attribute or exactly the value, respectively. Any reference signs in the claims should not be construed as limiting the scope.

The invention claimed is:

1. A device for handling and grading living birds, wherein the device comprises:
   a main member;
   a receiving member rotatably attached to the main member and configured to receive and hold a bird by its scapula-humeral joint in a first position and to release the bird in a second position of the receiving member, the receiving member comprising at least two substantially V-shaped members, each of the at least two substantially V-shaped members having an elongate portion, a first leg extending downwardly from the elongate portion, a bend portion at an end of the first leg to receive the bird at its scapula-humeral joint, and a second leg extending upwardly from the bend portion; and
   a locking member movably attached to the main member and configured to lock the receiving member in the first position and to unlock the receiving member to rotate the receiving member from its first position to its second position to release the bird.

2. The device according to claim 1, wherein at least one of the at least two V-shaped members is rotatably attached to the receiving member to allow receiving birds of different sizes.

3. The device according to claim 2, wherein the receiving member further comprises at least one limitation member to limit rotation of the at least one V-shaped member within a predetermined range.

4. The device according to claim 1, wherein the receiving member further comprises a counter weight member at a second end of the receiving member configured to rotate the receiving member from the second position to the first position after releasing the bird.

5. The device according to claim 1, wherein the main member comprises a hook member configured to attach the device to an external system.

6. The device according to claim 1, wherein the device further comprises a back support configured to support the bird in a back region of the bird.

7. The device according to claim 6, wherein the back support comprises a plastic plate.

8. The device according to claim 1, wherein the main member comprises a hook member configured to attach the device to an automated handling and grading system.

9. A device for handling and grading living birds, wherein the device comprises:
 a main member;
 a receiving member rotatably attached to the main member and configured to receive and hold a bird by its scapula-humeral joint in a first position and to release the bird in a second position of the receiving member, wherein the receiving member comprises at least two substantially V-shaped members at a first end of the receiving member, wherein at least one of the at least two V-shaped members is rotatably attached to the receiving member to allow receiving birds of different sizes, wherein the receiving member is configured to rotate around a first axis and the at least one V-shaped member is configured to rotate around a second axis which is different from the first axis; and
 a locking member movably attached to the main member and configured to lock the receiving member in the first position and to unlock the receiving member to rotate the receiving member from its first position to its second position to release the bird.

10. A system for handling and grading birds, wherein the system comprises:
 at least one device, comprising
  a main member;
  a receiving member rotatably attached to the main member and configured to receive and hold a bird by its scapula-humeral joint in a first position and to release the bird in a second position of the receiving member, the receiving member having laterally extending elongate portions, first legs extending downwardly from the elongate portions, bend portions at ends of the first legs to receive the bird at its scapula-humeral joint, and second legs extending upwardly from the bend portions; and
  a locking member, wherein the locking member is movably attached to the main member and configured to lock the receiving member in the first position and to unlock the receiving member to rotate the receiving member from its first position to its second position to release the bird;
 at least one fixation member configured to be releasably attached to the at least one device and to travel along a path;
 a weighing member configured to weigh the at least one device with the bird and to determine a weight of the bird; and
 at least two releasing members configured to automatically move the locking member of the at least one device according to the weight of the bird to release the bird from the at least one device at a release location along the path that depends on the weight of the bird.

11. The system according to claim 10, wherein the system further comprises at least one vaccination member configured to automatically vaccine the bird while being held by the receiving member and/or at least one counting member to count the birds.

12. The system according to claim 10, wherein the system further comprises at least one processing device coupled to the weighing member and configured to determine the weight of the bird based on an output signal of the weighing member and a tare weight of the at least one device.

13. A method for handling and grading birds, comprising the steps of:
 receiving and holding a bird by its scapula-humeral joint in a first position by a receiving member, the receiving member having laterally extending elongate portions, first legs extending downwardly from the elongate portions, bend portions at ends of the first legs to receive the bird at its scapula-humeral joint, and second legs extending upwardly from the bend portions;
 automatically rotating the receiving member around a first axis from the first position to a second position and thereby releasing the bird and rotating the receiving member around the first axis from the second position to the first position.

14. The method according to claim 13, wherein receiving and holding the bird comprises rotating at least one of two V-shaped members around a second axis, which is different from the first axis.

15. The method according to claim 14, wherein rotating the at least one of the V-shaped members comprises rotating the at least one of the V-shaped members within a predetermined range using at least one limitation member.

16. The method according to claim 13, wherein automatically rotating the receiving member around the first axis from the second position to the first position comprises automatically rotating the receiving member around the first axis from the second position to the first position using a counter weight member attached to a second end of the receiving member.

17. The method according to claim 13, wherein the method further comprises a step of attaching the receiving member and a locking member to an external system.

18. The method according to claim 13, wherein the method further comprises at least one of the following steps:
 a step of automatically determining a weight of the bird,
 a step of automatically counting the bird,
 a step of automatically grading the bird corresponding to the weight of the bird, and
 a step of automatically vaccinating the bird.

19. The method according to claim 18, wherein the method further comprises a step of processing the weight of the bird to generate statistical information on a weight distribution of a plurality of birds.

20. The method according to claim 19, wherein the method further comprises a step of setting at least one delimiter weight for grading birds based on a user input and/or the generated statistical information on the weight distribution.

21. The method according to claim 13, wherein the method further comprises a step of attaching the receiving member and a locking member to an automated handling and grading system.

* * * * *